(12) United States Patent
Ravi et al.

(10) Patent No.: US 10,129,372 B2
(45) Date of Patent: Nov. 13, 2018

(54) TRANSFERRING MULTIPLE DATA SETS USING A MULTIPATH CONNECTION

(71) Applicant: NICIRA, INC., Palo Alto, CA (US)

(72) Inventors: Madhusudhan Ravi, Palo Alto, CA (US); Akshay Kumar Sreeramoju, Hyderabad (IN)

(73) Assignee: NICIRA, INC., Palo Alto, CA (US)

( * ) Notice: Subject to any disclaimer, the term of this patent is extended or adjusted under 35 U.S.C. 154(b) by 118 days.

(21) Appl. No.: 15/091,594

(22) Filed: Apr. 6, 2016

(65) Prior Publication Data

US 2017/0163775 A1 Jun. 8, 2017

(30) Foreign Application Priority Data

Dec. 8, 2015 (IN) .......................... 6569/CHE/2015

(51) Int. Cl.
*H04L 12/28* (2006.01)
*H04L 29/08* (2006.01)
*H04L 12/707* (2013.01)

(52) U.S. Cl.
CPC ............ *H04L 69/326* (2013.01); *H04L 45/24* (2013.01)

(58) Field of Classification Search
CPC .............................. H04L 69/326; H04L 45/24
USPC ....................................... 370/254, 255, 256
See application file for complete search history.

(56) References Cited

U.S. PATENT DOCUMENTS

| | | | |
|---|---|---|---|
| 9,548,924 B2 | 1/2017 | Pettit et al. | |
| 9,838,276 B2 | 12/2017 | Pettit et al. | |
| 2012/0226802 A1* | 9/2012 | Wu | H04L 1/1825 709/224 |
| 2012/0331160 A1 | 12/2012 | Tremblay et al. | |
| 2013/0077501 A1* | 3/2013 | Krishnaswamy | H04L 47/193 370/252 |
| 2013/0195004 A1 | 8/2013 | Hampel | |
| 2014/0153583 A1 | 6/2014 | Gouache et al. | |
| 2014/0269289 A1* | 9/2014 | Effros | H04L 47/38 370/231 |
| 2014/0341023 A1* | 11/2014 | Kim | H04W 28/0278 370/230.1 |
| 2014/0351447 A1* | 11/2014 | Annamalaisami | H04L 65/1069 709/227 |

(Continued)

OTHER PUBLICATIONS

R. Winter et al., Multipath TCP Support for Single-homed End-systems (draft-wr-mptcp-single-homed-04), published by Internet Engineering Task Force (IETF), dated Feb. 25, 2013, 8 pages.

*Primary Examiner* — Chuong T Ho
(74) *Attorney, Agent, or Firm* — Su IP Consulting

(57) ABSTRACT

Example methods are provided for a first endpoint to transfer a first data set and a second data set to a second endpoint using a multipath connection. The method may comprise detecting the first data set and the second data set from an application executing on the first endpoint for transfer to the second endpoint. The method may comprise, in response to determination that in-order transfer is not required for the first data set and the second data set, establishing a first subflow of a multipath connection with the second endpoint to send the first data set and establishing a second subflow of the multipath connection to send the second data set. The method may further comprise sending the first data set on the first subflow and the second data set on the second subflow to the second endpoint.

16 Claims, 7 Drawing Sheets

(56) References Cited

U.S. PATENT DOCUMENTS

| | | | |
|---|---|---|---|
| 2016/0094465 A1* | 3/2016 | Park | H04L 43/0864 |
| | | | 370/235 |
| 2016/0205586 A1* | 7/2016 | Kim | H04L 1/1607 |
| | | | 370/230 |
| 2016/0218960 A1 | 7/2016 | Sundarababu et al. | |
| 2016/0261722 A1* | 9/2016 | Paasch | H04L 47/193 |
| 2016/0309534 A1* | 10/2016 | Teyeb | H04L 69/14 |
| 2017/0048146 A1 | 2/2017 | Sane et al. | |
| 2017/0163522 A1 | 6/2017 | Sreeramoju et al. | |
| 2017/0163539 A1 | 6/2017 | Sreeramoju et al. | |
| 2017/0163774 A1 | 6/2017 | Boucadair et al. | |
| 2018/0062979 A1* | 3/2018 | Zee | H04W 80/06 |

\* cited by examiner

US 10,129,372 B2

TRANSFERRING MULTIPLE DATA SETS USING A MULTIPATH CONNECTION

RELATED APPLICATIONS

Benefit is claimed under 35 U.S.C. 119(a)-(d) to Foreign application Serial No. 6569/CHE/2015 filed in India entitled "TRANSFERRING MULTIPLE DATA SETS USING A MULTIPATH CONNECTION", on Dec. 8, 2015, by Nicira, Inc., which is herein incorporated in its entirety by reference for all purposes.

CROSS-REFERENCE TO RELATED APPLICATIONS

The present application is related in subject matter to U.S. patent application Ser. No. 15/176,179 and U.S. patent application Ser. No. 15/176,251, which are incorporated herein by reference.

BACKGROUND

Unless otherwise indicated herein, the approaches described in this section are not admitted to be prior art by inclusion in this section.

Communications networks are generally packet-switched networks that operate based on Internet Protocol (IP). When one endpoint (e.g., host) has data to send to another endpoint, the data may be transmitted as a series of packets. Transmission Control Protocol (TCP) is a transport layer protocol that offers reliable data transfer between two endpoints. TCP is connection-oriented protocol that requires endpoints to establish a connection before data transfer occurs. Although widely implemented, TCP is designed to ensure that data is delivered according to a particular order from one endpoint to another, which may not be optimal for network throughput and resource utilization.

DETAILED DESCRIPTION

Figure 1:
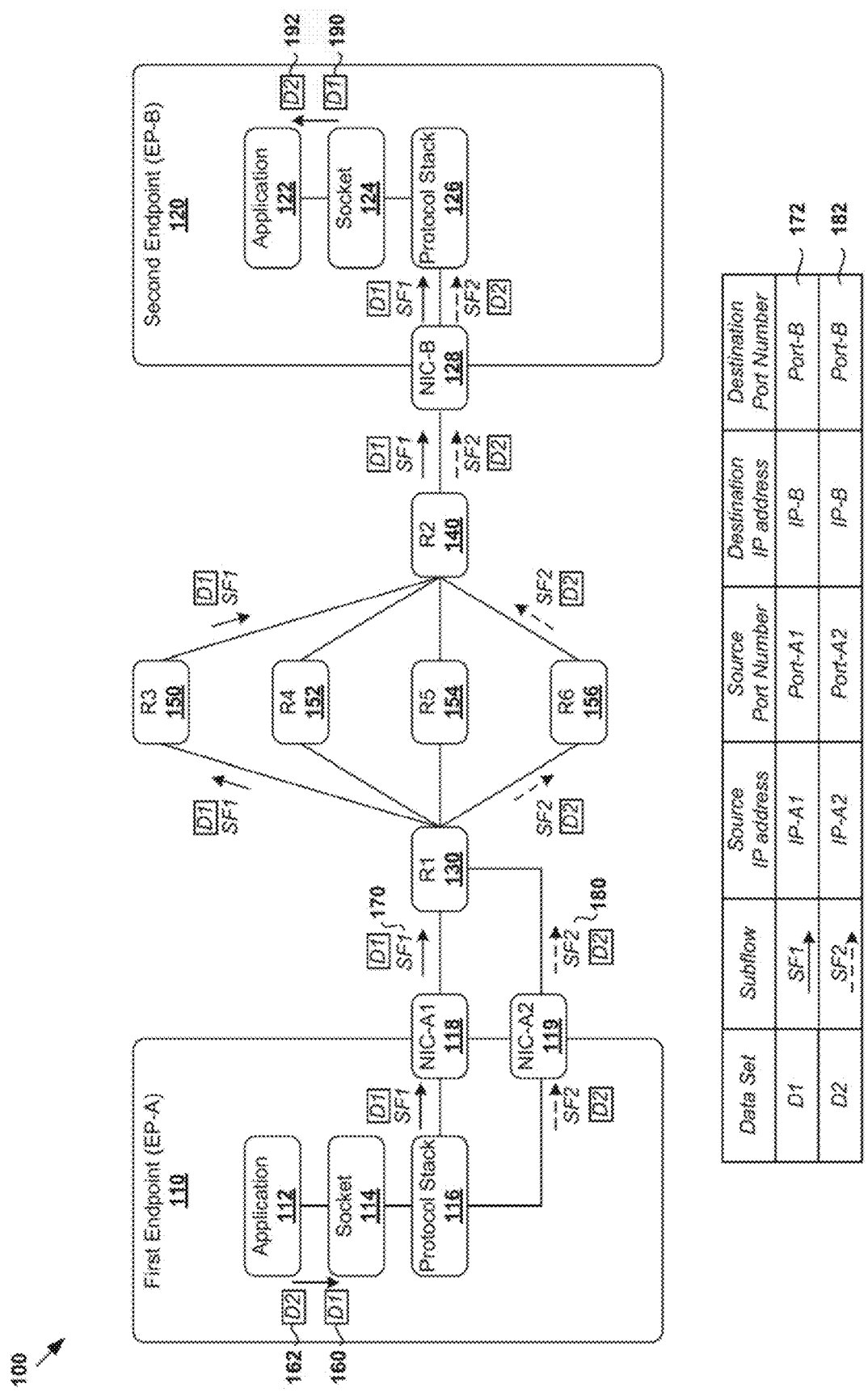
FIG. 1 is a schematic diagram illustrating an example network environment in which multiple data sets may be transferred using a multipath connection.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Conventional Transmission Control Protocol (TCP) is designed to ensure in-order transfer during a connection. For example, when a web server has several web page objects (e.g., O1, O2, O3, O4 and O5) to send to a client for display on a web browser, these objects are usually sent according to a particular order. The web server may first send O1, followed by O2, O3, O4 and then O5 during the TCP connection. This order according to which data is sent by the web server affects how the data is displayed on the web browser at the client. If a packet containing part or whole of O1 is dropped, all other packets containing O2, O3, O4 and O5 will not be delivered to the web browser until the dropped packet is retransmitted.

The above problem is known as head-of-line blocking, which adversely affects application throughput and causes unnecessary delay and longer page load time at the client. This problem is especially evident in applications where objects (e.g., O1, O2, O36, O4 and O5 in the above example) are independent of each other. In this case, it is not necessary for the source to send, and the destination to receive, them according to a particular order. One conventional approach to mitigate head-of-line blocking is to establish multiple TCP connections, such as one for each web page object. However, this approach is inefficient and requires many resources, such as to open and manage multiple sockets at both endpoints.

According to examples of the present disclosure, a multipath connection may be established to transfer multiple data sets. For example, Multipath Transmission Control Protocol (MPTCP) is a multipath connection protocol that utilizes multiple paths simultaneously to transfer data between endpoints. An MPTCP connection begins similarly to a regular TCP connection, and includes multiple subflows that are established as required. Instead of using a TCP connection that enforces in-order transfer strictly, subflows allow multiple data sets to be transferred independently over multiple paths. This reduces head-of-line blocking and thereby improves application throughput and performance.

In the following, although "multipath connection" is exemplified using an MPTCP connection, it should be understood that other suitable protocol may be used. Throughout the present disclosure, the term "multipath connection" may refer generally to a set of subflows between two endpoints. The term "data set" may refer generally to any group or block of data. For example, in the above web browsing application, a data set may contain a single page object (e.g., O1), or multiple page objects (e.g., O1 and O2). Depending on the application, a data set may be in any other suitable form, such as memory page, file, storage object, virtual machine data, virtual disk file, etc.

In more detail, FIG. 1 is a schematic diagram illustrating example network environment 100 in which multiple data sets may be transferred using a multipath connection. It should be understood that network environment 100 may include additional and/or alternative components than that shown, depending on the desired implementation. Network environment 100 includes first endpoint 110 (see "EP-A") and second endpoint 120 (see "EP-B"). Here, the term "endpoint" may refer generally to an originating or terminating node of a bi-directional inter-process communication flow. In practice, endpoint 110/120 may be implemented using or supported by any suitable computing device, such as a physical host computing device, virtual machine running on a computing device within a virtualized computing environment, etc.

Each endpoint 110/120 executes application 112/122 (one shown for simplicity) having access to protocol stack 116/126 via socket 114/124. Protocol stack 116/126 is divided into several layers, such as transport layer (e.g., MPTCP, TCP), network layer (e.g., Internet Protocol (IP) layer), etc. Socket 114/124 serves as a protocol-independent interface for application 112/122 to access protocol stack 116/126, such as via socket system calls. Here, the term "socket system call" may refer generally to a software function that is called or invoked by application 112/122 (e.g., a user-level process) to access a service supported by protocol stack 116/126 (e.g., a kernel-level process), such as to send data to EP-B 120, etc.

As defined in Request for Comments (RFC) 6824 published by the Internet Engineering Task Force (IETF), an MPTCP connection may be established between EP-A 110 and EP-B 120 provided at least one of the endpoints is multi-homed (i.e., having multiple network interfaces) and multi-addressed (i.e., having multiple IP addresses). In the example in FIG. 1, EP-A 110 is multi-homed while EP-B 120 is single-homed (i.e., one network interface). Here, the term "network interface" may refer generally to any suitable component that connects an endpoint to a network, such as a network interface controller or card (NIC), etc. At EP-A 110, network interfaces "NIC-A1" 118 and "NIC-A2" 119 are assigned with respective addresses IP-A1 and IP-A2. At EP-B 120, network interface "NIC-B" 128 is assigned with IP-B.

EP-A 110 and EP-B 120 are connected via various intermediate devices, such as R1 130, R2 140, R3 150, R4 152, R5 154 and R6 156. Each intermediate device may be any suitable physical or virtual network device, such as a router, switch, gateway, any combination thereof, etc. EP-A 110 is connected to R1 130 via NIC-A1 118 and NIC-A2 119, and EP-B 120 to R2 140 via NIC-B 128. R1 130 provides multiple paths between EP-A 110 and EP-B 120. In particular, a first path is formed by the connection between R1 130 and R2 140 via R3 150, a second path via R4 152, a third path via R5 154, and a fourth path via R6 156.

In the example in FIG. 1, application 112 executing on EP-A 110 wishes to transfer first data set (see "D1" 160) and second data set (see "D2" 162) to application 122 executing on EP-B 120. According to examples of the present disclosure, it is determined whether in-order transfer is required for D1 160 and D2 162. If not required, data transfer may be improved in network environment 100 by establishing an MPTCP connection between EP-A 110 and EP-B 120. For example in FIG. 1, first subflow 170 (see "SF1") and second subflow 180 (see "SF2") may be established to send D1 160 and D2 162, respectively. Since subflows SF1 170 and SF2 180 operate independently of each other, D1 160 and D2 162 may be sent in parallel to reduce head-of-line blocking.

The mapping between an MPTCP connection and socket 114/124 is generally one-to-one. For example in FIG. 1, application 112 only needs to open one socket 114 to establish subflow SF1 170 to send D1 160 and SF2 180 to send D2 162. The term "subflow" may refer generally to a flow of data over a path formed by a sequence of links between two endpoints. Further, although two subflows are described, the number of subflows of an MPTCP connection is not fixed, and adjustable during the lifetime of the MPTCP connection.

More detailed examples will be discussed with reference to FIG. 2, which is a flowchart of example process 200 to transfer first data set 160 and second data set 162 using a multipath connection. Example process 200 may include one or more operations, functions, or actions illustrated by one or more blocks, such as blocks 210 to 260. The various blocks may be combined into fewer blocks, divided into additional blocks, and/or eliminated depending on the desired implementation.

Figure 2:
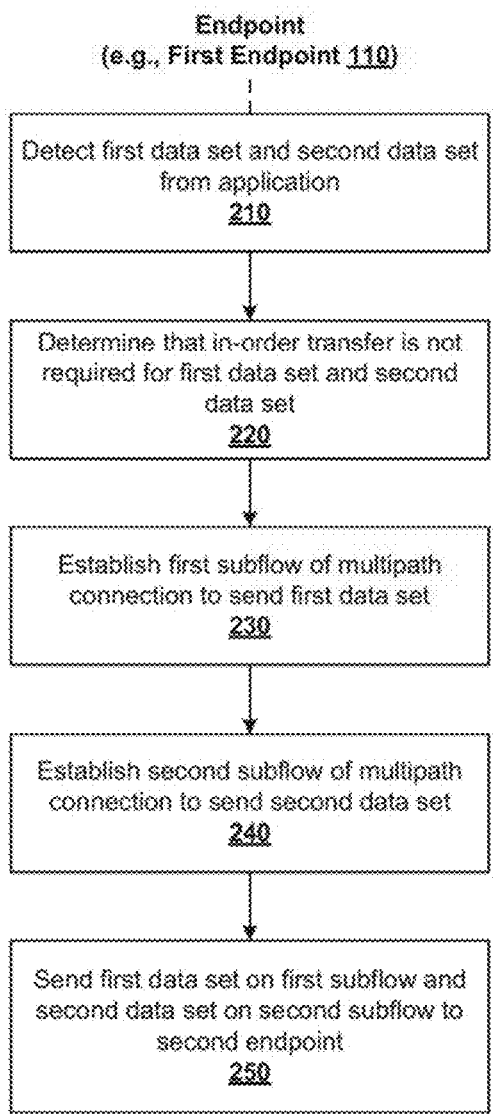
FIG. 2 is a flowchart of an example process to transfer a first data set and a second data set using a multipath connection.

Referring first to 210 in FIG. 2, EP-A 110 detects first data set (see D1 160 in FIG. 1) and second data set (see D2 162 in FIG. 1) from application 112 executing on EP-A 110 for transfer to EP-B 120. At 220 in FIG. 2, EP-A 110 EP-A 110 determines that in-order transfer is not required for D1 160 and D2 162.

Any suitable approach may be used at 210, such as detecting socket system calls invoked by application 112 to send D1 160 and D2 162 via socket 114. As will be further described using examples in FIG. 3, FIG. 4, FIG. 5A and FIG. 5B, the determination at 220 may be based on tag information, such as "Tag-D1" associated with D1 160 and "Tag-D2" associated with D2 162. For example, by comparing "Tag-D 1" with "Tag-D2", protocol stack 116 is cognizant that D1 160 is independent of D2 162.

The term "tag information" may refer generally to information, such as a label, keyword, category, class, or the like, assigned to a particular piece of data to indicate its independence from other data assigned with different tag information. In one example in FIG. 5A, the tag information may be included as a parameter in the socket system calls invoked by application 112. In another example in FIG. 5B, the tag information may be included in the data (i.e., D1 160 and D2 162) sent by application 112 via the socket system calls. Based on cognizance of D1 160 being independent of D2 162, EP-A 110 may establish a multipath connection to send them over multiple paths.

In particular, at 230 in FIG. 2, in response to the determination at 220 (i.e., in-order transfer is not required), EP-A 110 establishes SF1 170 of an MPTCP connection with EP-B 120 to send D1 160. Further, at 240 in FIG. 2, EP-A 110 establishes second subflow SF2 180 of the MPTCP connection with EP-B 120 to send D2 162. As will be described further using FIG. 4, the establishment processes at 230 and 240 may involve a three-way handshake between EP-A 110 and EP-B 120.

SF1 170 is identified by first set of tuples 172 and SF2 180 by second set of tuples 182 configured by EP-A 110. The term "set of tuples" may generally refer to a 4-tuple in the form of (source IP address, source port number, destination IP address, destination port number) for uniquely identifying a bi-directional connection between EP-A 110 and EP-B 120. In practice, a 5-tuple set (i.e., 4-tuple plus protocol information) may also be used. In the example in FIG. 1, first set of tuples 172 is configured as (IP-A1, Port-A1, IP-B, Port-B) and second set of tuples 182 as (IP-A1, Port-A2, IP-B, Port-B). Both subflows 170, 180 share the same destination IP address and destination port number.

At 250 in FIG. 2, EP-A 110 sends D1 160 on SF1 170, and D2 162 on SF2 180 to EP-B 120. For example, D1 160 and D2 162 may be sent in a series of packets, such as first packets for D1 160 and second packets for D2 162. The term "packets" may refer generally to a group of bits that can be transported together from a source to a destination, and may be in another form, such as "frames", "messages", "segments", etc. In the example in FIG. 1, D1 160 is sent over NIC-A1 118 to travel on a first path from EP-A 110 to EP-B 120 via R1 130, R3 150 and R2 140. On the other hand, D2 162 is sent over NIC-A2 119 to travel on a second path via R1 130, R6 156 and R2 140.

Using example process 200, D1 160 and D2 162 that are independent of each other may be sent in parallel to EP-B 120 using the MPTCP connection to improve application throughput and performance. Since in-order transfer is not required, the effect of head-of-line blocking is also reduced. For example, when a packet containing part or whole of D1 160 is lost, it is not necessary for D2 162 to wait for the retransmission of the lost packet before D2 162 can be delivered to application 122 at destination EP-B 120.

It should be understood that in-order transfer of packets on a particular subflow (e.g., SF1 170) is still maintained. In practice, the packets are assigned a sequence number to maintain a particular order within a subflow. However, since D1 160 and D2 162 are independent of each other and sent on respective subflows SF1 170 and SF2 180, they may arrive at EP-B 120 for delivery to application 122 in any order. For example in FIG. 1, depending on conditions (e.g., congestion) on the first path via R1 130, R3 150 and R2 140, D2 (see 192) may be delivered to application 122 before D1 (see 190). Protocol stack 126 of EP-B 120 may distinguish D1 (see 190) and D2 (see 192) from each other based on first set of tuples 172 identifying SF1 170 and second set of tuples 182 identifying SF2 180, respectively. As packets of SF1 170 and SF2 180 are received independently, EP-B 120 may store the packets received on a particular subflow in a different buffer, memory location, etc. Once all packets on that particular subflow (e.g., SF2 180) are received, protocol stack 126 delivers the corresponding data (e.g., D2) to application 122 via socket 124 independently of other subflow(s).

In practice, example process 200 may be implemented by endpoints without requiring any software and/or hardware changes to intermediate devices R1 130 to R6 156. Since there are usually many intermediate devices connecting a pair of endpoints, the costs of implementing example process 200 may be reduced.

In the following, various examples will be explained with reference to FIG. 3 to FIG. 7. In particular, an example implementation in a data center environment will be discussed using FIG. 3 and FIG. 4; example processes to determine that in-order transfer is not required using FIG. 5A and FIG. 56; and example configuration of a network-cognizant mode by a single-homed endpoint using FIG. 6 and multi-homed endpoint using FIG. 7.

Data Center Environment

Figure 3:
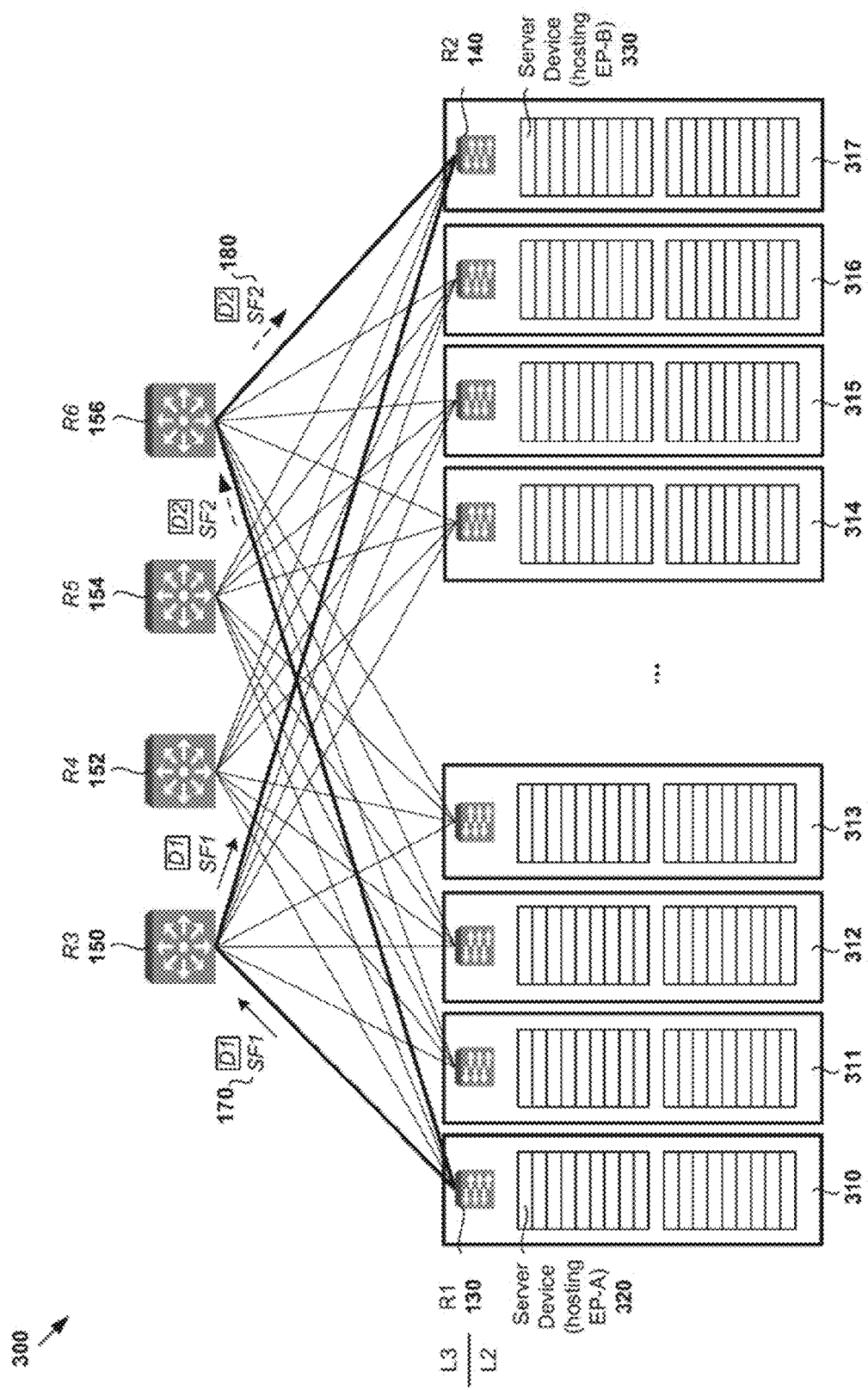
FIG. 3 is a schematic diagram illustrating an example data center environment in which the example process in FIG. 2 may be implemented.

In the following, network environment 100 in FIG. 1 represents a data center environment. FIG. 3 is a schematic diagram illustrating example data center environment 300 in which example process 200 in FIG. 2 may be implemented. It should be understood that data center environment 300 may include additional and/or alternative components than that shown, depending on the desired implementation.

In the example in FIG. 3, data center environment 300 employs a leaf-spine topology with inter-connected leaf switches and spine switches. Compared to a conventional three-tier topology, the leaf-spine topology improves scalability, reliability and efficiency in data center environment 300. Rack units 310-317 (also known as racks) are used to house physical server devices, each hosting physical hosts or virtual machines capable of acting as endpoints. For example, EP-A 110 is supported by first server device 320 of left-most rack unit 310 and EP-B 120 by second server device 322 of right-most rack unit 317.

It should be understood that a "virtual machine" is one form of workload. In general, a workload may represent an addressable data compute node or isolated user space instance. In practice, any suitable technologies aside from hardware virtualization may be used to provide isolated user space instances. For example, other workloads may include physical hosts, client computers, containers (e.g., running on t op of a host operating system without the need for a hypervisor or separate operating system), virtual private servers, etc. The virtual machines may also be complete computation environments, containing virtual equivalents of the hardware and system software components of a physical computing system.

Server devices are inter-connected via top-of-rack (ToR) leaf switches and spine switches. For example, intermediate devices R1 130 and R2 140 (introduced in FIG. 1) may represent leaf switches, while R3 150, R4 152, R5 154 and R6 156 represent spine switches in data center environment 300. All leaf switches are connected to all spine switches, but leaf switches and spine switches are not connected directly to each other. Each leaf switch operates at a layer-2/layer-3 boundary and acts as a getaway from a layer-2 network onto a layer-3 distributed fabric formed by the spine switches. As used herein, the term "layer-2" generally refers to a Media Access Control (MAC) layer and "layer-3" to a network layer in the Open System Interconnection (OSI) model, although the concepts described herein may be applicable to other networking models.

Due to the leaf-spine topology, all server devices are exactly the same number of hops away from each other. For example, packets from left-most rack unit 310 to right-most rack unit 317 may be routed with equal cost via any one of spine switches R3 150, R4 152, R5 154 and R6 156. Leaf switches and/or spine switches may implement flow balancing features such as Equal Cost Multipath (ECMP) routing, NIC teaming, Link Aggregation Control Protocol (LACP), etc. For example, leaf switch R1 130 is ECMP-capable and configured to distribute subflows from downstream server device 320 hosting EP-A 110 to any one of the upstream spine switches R3 150, R4 152, R5 154 and R6 156.

In data center environment 300, various applications may require high volume data transfers, such as virtual machine migrations, backups, cloning, file transfers, data placement on a virtual storage area network (SAN), fault tolerance, high availability (HA) operations, etc. In some cases, data transfers may involve sending large amount Internet Small Computer System Interface (iSCSI) traffic and/or Network File System (NFS) traffic between endpoints. In these applications, since in-order transfer is generally not required, example process 200 may be used to send multiple data sets in parallel.

Figure 4:
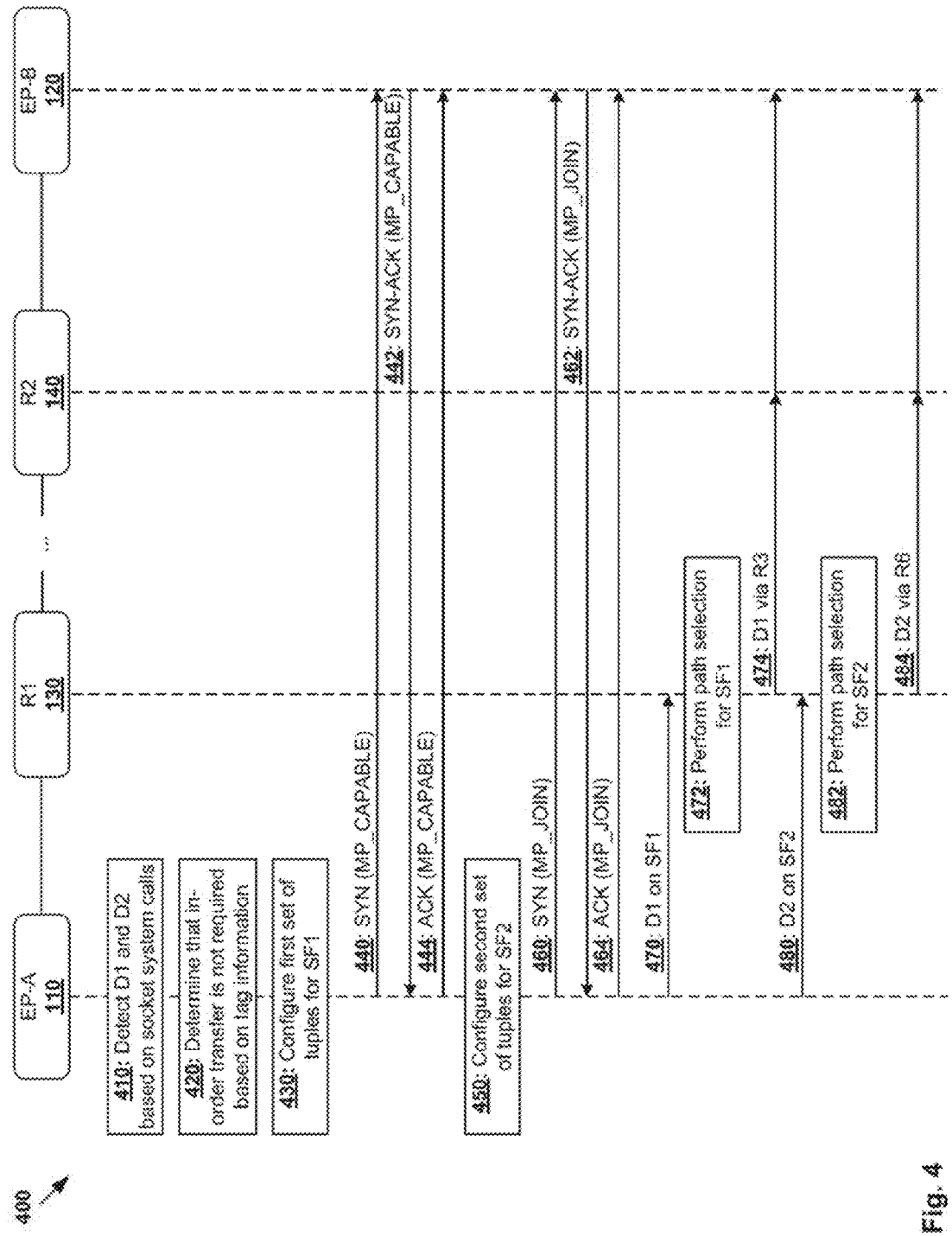
FIG. 4 is a flow diagram illustrating example communication in the data center environment in FIG. 3 to establish a first subflow and a second subflow of a multipath connection.

FIG. 4 is a flow diagram illustrating example communication 400 in data center environment 300 in FIG. 3 to establish first subflow 170 and second subflow 180 of a multipath connection. FIG. 4 will be explained with reference to FIG. 5A and FIG. 5B. These examples are illustrated using one or more operations, functions, or actions, such as 410 to 484 in FIG. 4, 510 to 535 in FIG. 5A and 550 to 575 in FIG. 5B. The various operations, functions, or actions may be combined, divided, and/or eliminated based upon the desired implementation.

Referring first to 410 and 420 in FIG. 4 (related to 210 and 220 in FIG. 2), EP-A 110 detects D1 160 and D2 162 from application 112 and determines that in-order transfer is not required. Two examples will be discussed below. First example process 500 in FIG. 5A involves application 112 tagging socket system calls to indicate that in-order transfer is not required, while second example process 540 involves the tagging of D1 160 and D2 162 to indicate the same. It should be understood that alternative approach may be used.

Figure 5A:
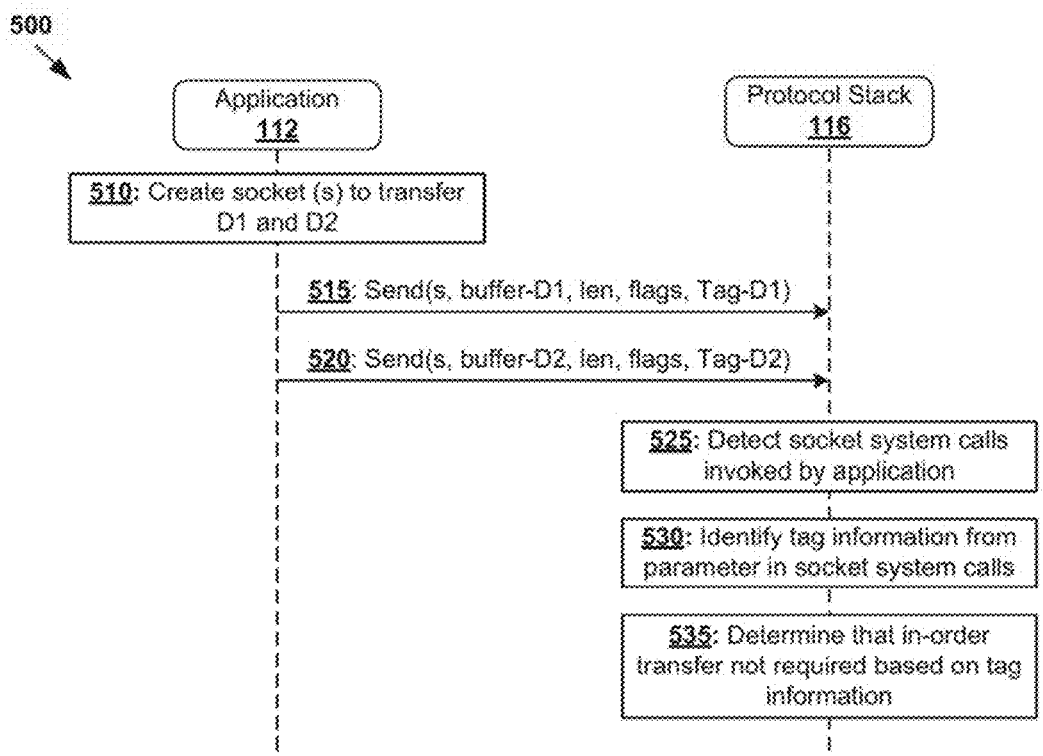
FIG. 5A is a flow diagram illustrating a first example process to determine that in-order transfer is not required.

FIG. 5A is a flow diagram illustrating first example process 500 to determine that in-order transfer is not required. At 510 in FIG. 5A, application 112 creates socket 114 to establish a connection with EP-B 120. For example, application 112 creates socket 114 by invoking a socket system call, such as socket( ) that returns a new descriptor (referred to as "s") with which new socket 114 may be identified in subsequent system calls.

At 515 and 520 in FIG. 5A, application 112 invokes socket system calls to send D1 160 and D2 162. In particular, "send(s, buffer-D1, len, flags, Tag-D1)" is a first socket system call invoked to send D1 160, and "send(s, buffer-D2, len, flags, Tag-D2)" is a second socket system call to send D2 162. Each socket system call includes a parameter for application 112 to provide tag information associated with a particular data set, such as "Tag-D1" associated with D1 160 and "Tag-D2" with D2 162. Other parameters include "s" to specify the descriptor of socket 114, "buffer-D1" to specify a data buffer storing D1 160; "buffer-D2" to specify a data buffer storing D2 162; "len" to specify the length of associated data buffer; "flags" to specify control information.

At 525 and 530 in FIG. 5A, protocol stack 116 detects socket system calls invoked by application 112 and identifies tag information based on the socket system calls. In particular, protocol stack 116 extracts "Tag-D1" from "send(s, buffer-D1, len, flags, Tag-D1)," and "Tag-D2" from "send(s, buffer-D2, len, flags, Tag-D2)." At 535 in FIG. 5A, protocol stack 116 compares "Tag-D1" with "Tag-D2." Since the different tag information indicates that D1 160 is independent of D2 162, protocol stack 116 determines that in-order transfer is not required for D1 160 and D2 162.

To implement first example process 500, conventional socket system call send(s, buffer, len, flags) may be modified to include an additional parameter to specify the tag information. This allows application 112 to tag the socket system calls at 515 and 520, and protocol stack 116 to identify the tag information at 525. In cases where it is not feasible to modify send( ), second example process 540 in FIG. 5B may be used.

Figure 5B:
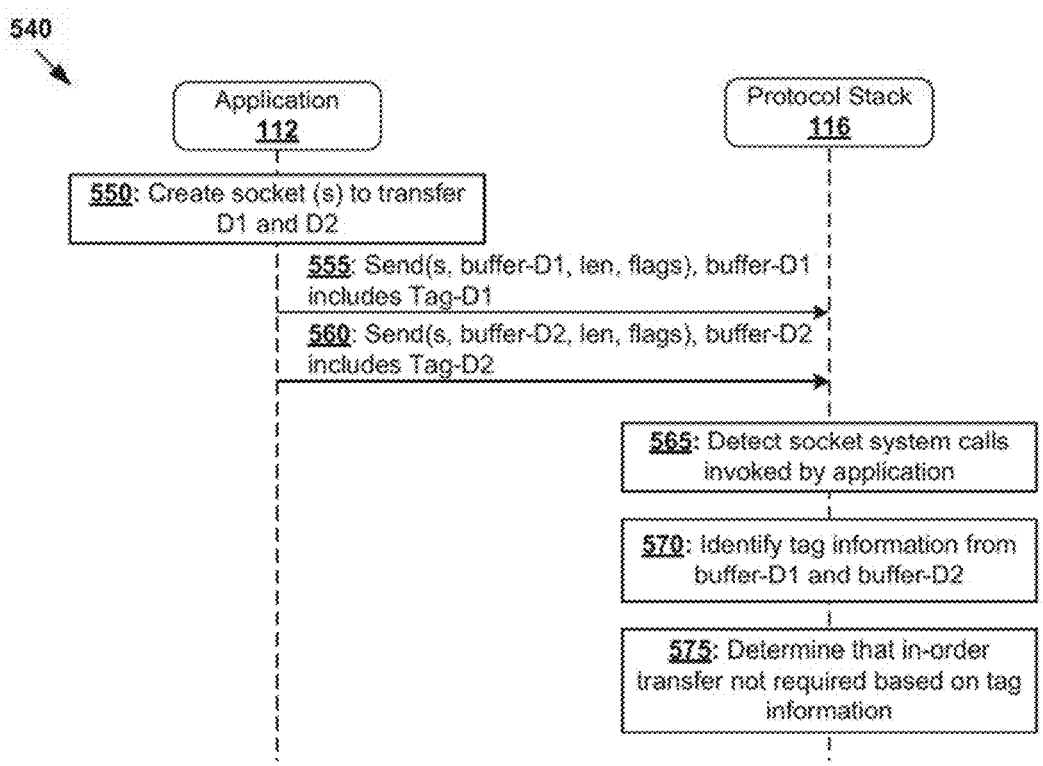
FIG. 5B is a flow diagram illustrating a second example process to determine that in-order transfer is not required.

FIG. 5B is a flow diagram illustrating second example process 540 to determine that in-order transfer is not required. Similar to first example process 500 in FIG. 5A, second example process 540 in FIG. 5B involves application 112 creating new socket 114 at 550, and sending D1 160 and D2 162 at 555 and 560. However, instead of tagging each socket system call, application 112 includes tag information in the data set itself.

For example, "Tag-D1" may be included in "buffer-D1" and "Tag-D2" in "buffer-D2". In this case, "send(s, buffer-D1, len, flags) for D1" is a first socket system call invoked to send D1 160, and "send(s, buffer-D2, len, flags)" is a second socket system call invoked to send D2 162. In practice, the tag information may be included at the beginning of each buffer, end of the buffer, or any other predetermined location for ease of identification by protocol 116.

At 565 and 570 in FIG. 5B, protocol stack 116 detects the socket system calls invoked by application 112 and proceeds to identify tag information from the respective data sets. In particular, "Tag-D1" may be identified from "buffer-D1" and "Tag-D2" from "buffer-D2." At 575 in FIG. 5B, protocol stack 116 compares "Tag-D1" with "Tag-D2." Since the different tag information indicates that D1 160 is independent of D2 162, protocol stack 116 determines that in-order transfer is not required.

Although socket system call "send( )" is used in the above examples, it should be understood that any other suitable system call may be used, such as "sendto( )," "sendmsg( )," "write( )," "writev( )," etc. Any alternative tagging approach may also be used. For example, in another approach, control information "flags" in each "send( )" system call may be modified to include an flag (e.g., MSG_TAG) containing the tag information.

Referring to FIG. 4 again, once it is determined that in-order transfer is not required at 420. EP-A 110 proceeds to establish SF1 170 and SF2 180. In particular, at 430 in FIG. 4 (related to 230 in FIG. 2), EP-A 110 configures first set of tuples 172 identifying subflow SF1 170. For example, first set of tuples 172 is configured to be (source IP address=IP-A1, source port number=Port-A1, destination IP address=IP-B, destination port number=Port-B). The MAC address of NIC-A1 118 may be used as the source MAC address and MAC-B of NIC-B 128 as the destination MAC address.

At 440, 442 and 444 in FIG. 4 (related to 230 in FIG. 2), a three-way handshake is used to establish SF1 170. At 440, EP-A 110 sends a synchronization (SYN) packet to EP-B 120. At 442, EP-B 120 responds with a synchronization-acknowledgement (SYN-ACK) packet, to which EP-A 110 responds with an ACK packet at 444. Option MP_CAPABLE is used in the SYN, SYN-ACK and ACK packets to allow EP-A 110 and EP-B 120 to verify that MPTCP is supported, and exchange key information for subsequent addition of subflows.

At 450 in FIG. 4 (related to 240 in FIG. 2), EP-A 110 configures second set of tuples 182 for identifying subflow SF2 180, such as (source IP address=IP-A2, source port number=Port-A2, destination IP address=IP-B, destination port number=Port-B). The MAC address of NIC-A2 119 may be used as the source MAC address and MAC-B of NIC-B 128 as the destination MAC address.

At 460, 462 and 464 in FIG. 4 (related to 240 in FIG. 2), a three-way handshake is also used to establish subflow SF2 180. At 460, EP-A 110 sends a SYN packet to EP-B 120. At 462, EP-B 120 responds with a SYN-ACK packet, and at 464, EP-A 110 responds with an ACK packet to complete the handshake. Instead of MP_CAPABLE, option MP_JOIN is used in the SYN, SYN-ACK and ACK packets to identify the MPTCP connection joined by the new subflow SF2 180. In practice, key information exchanged in the initial MP_CAPABLE handshake (see 440, 442 and 444) will be used in the MP_JOIN option.

At 470 and 480 in FIG. 4 (related to 250 in FIG. 2), EP-A 110 sends D1 160 on SF1 170 via NIC-A1 118 and D2 162 on SF2 180 via NIC-A2 119. Since in-order transfer is not required, it should be understood that D1 160 and D2 162 may be sent in parallel. D1 160 may be sent on SF1 170 as a series of first packets that each include first set of tuples 172. Similarly, D2 162 may be sent on SF2 180 as a series of second packets that each include second set of tuples 182.

During packet forwarding, next-hop leaf switch R1 130 performs path selection based on tuples 172/182 configured for each subflow 170/180. For example, at 472 and 474 in FIG. 4, R1 130 performs path selection based on first set of tuples 172 of SF1 170 to select spine switch R3 150 as the next hop. On the other hand, at 482 and 484 in FIG. 4, R1 130 selects R6 156 as the next hop based on second set of tuples 182 of SF2 180. In this case, R1 130 sends first packets of SF1 170 to EP-B 120 via spine switch R3 150, and second packets of SF2 180 via R6 156. Any suitable path selection algorithm may be used, such as modulo-based and range-based hash calculation algorithms using flow tuple hashing, etc.

At destination EP-B 120, since D1 160 and D2 162 are received on different subflows, it is not important whether D1 160 arrives before D2 162, D2 162 before D1 160, or both at the same time. However, in-order transfer of packets on a particular subflow (e.g., SF1 70) is maintained. For example, if a packet containing part of D1 160 is lost, the packet has to be retransmitted by EP-A 110 and received by EP-B 120 before subsequent packets on the same subflow are delivered to application 122. However, since D2 162 is sent independently, the packet loss will not affect D2 162 on SF2 180, thereby reducing head-of-line blocking.

After the subflows are established, it should be understood that application 112 may send further data associated with D1 160 using "Tag-D1." This indicates to protocol stack 116 that the further data should be sent on the same SF1 170 to maintain order. On the other hand, application 112 may send further data associated with D2 162 using "Tag-D2." Again, this is to indicate to protocol stack 116 that the further data should be sent on the same SF2 180 to maintain order. In practice, protocol stack 116 may store the tag information, and associated subflow, in any suitable data store (e.g., table) for subsequent reference.

Although two subflows are shown in the examples, it should be understood that EP-A 110 and EP-B 120 may be configured to support any number of subflows to transfer data in parallel. For example, application 112 may use "Tag-D3" for a third data set "D3." In this case, protocol stack 116 may determine whether a subflow has already been established for D3, such as by comparing "Tag-D3" with the known "Tag-D1" and "Tag-D2" (e.g., retrieved from the data store mentioned above). If not established, protocol stack 116 proceeds to establish a third subflow (e.g., SF3) to send D3 in parallel with D1 160 on SF1 170 and D2 162 on SF2 180. This further improves application throughput and performance.

Network-Cognizant Mode

Although EP-A 110 is multi-homed (i.e., having NIC-A1 118 and NIC-A2 119) in the example in FIG. 1, it should be understood that examples of the present disclosure may be implemented by a single-homed endpoint. Corresponding patent applications U.S. Patent Application No. 15/176,179 and U.S. Patent Application No. 15/176,251, which are fully incorporated by reference herein, explain possible approaches for a single-homed endpoint to establish an MPTCP connection and to influence path selection by intermediate devices such as R1 130. In this case, multiple subflows of the same MPTCP connection may be established over one network interface of the endpoint. This should be contrasted with the requirement of conventional MPTCP (e.g., defined in RFC 6824 published by IETF) for the endpoint to be multi-homed and multi-addressed.

Figure 6:
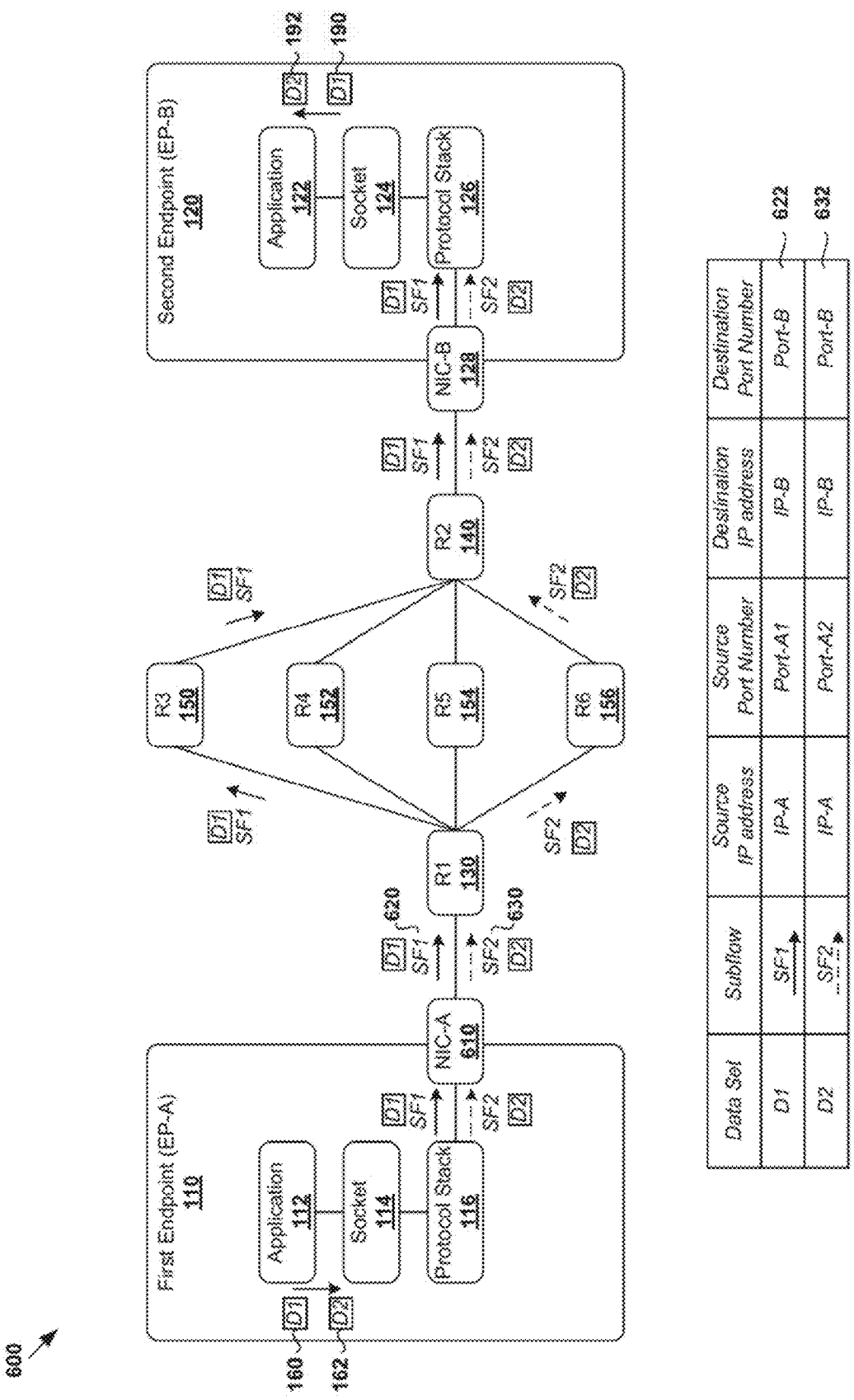
FIG. 6 is a schematic diagram illustrating an example network environment with an example single-homed endpoint operating in a network-cognizant mode.

In more detail, FIG. 6 is a schematic diagram illustrating example network environment 600 with example single-homed endpoint 110 operating in a network-cognizant mode. It should be understood that network environment 600 may include additional and/or alternative components than that shown, depending on the desired implementation. In this example, EP-A 110 is single-homed with one network interface "NIC-A" 610 having an IP address of "IP-A" (i.e., instead of two NICs in FIG. 1).

To establish an MPTCP connection over NIC-A 610, different port numbers are configured for subflows SF1 620 and SF2 630. For example, first set of tuples 622 is configured to be (IP-A, Port-A1, IP-B, Port-B) and second set of tuples 632 to be (IP-A, Port-A2, IP-B, Port-B), both sharing the same IP address. As such, although EP-A 110 is not multi-homed and multi-addressed, an MPTCP connection may be established to take advantage of the multiple paths between EP-A 110 and EP-B 120.

For example, according to first set of tuples 622, R1 130 may perform path selection to forward D1 160 on SF1 620 to EP-B 120, such as on a first path formed by R1 130, R3 150 and R2 140. A different path may be used for D2 162. For example, according to second set of tuples 632, R1 130 may perform path selection to forward D2 162 on SF2 630 to EP-B 120, such as on a second path formed by R1 130, R6 156 and R2 140.

In practice, the maximum number of subflows that can be used to transfer data in parallel may be configured. For example, EP-A 110 may be configured to have cognizance of the multiple paths between them and operate in a "network-cognizant mode." Here, the term "cognizance" (of the multiple paths) and related "network-cognizant" may refer generally to one endpoint (e.g., EP-A 110) having awareness or knowledge of the multiple paths (e.g., further within the network) that lead to another endpoint.

Such cognizance of the multiple paths may then be exploited by application 112 of EP-A 110 to include tag information when sending data to EP-B 120 according to the examples in FIG. 5A and FIG. 5B. This in turn allows protocol stack 116 to determine that in-order transfer is not required based on the tag information. For example, the maximum number of subflows may be set to four (i.e., MAX_SF=4), which is also the number of spine switches (i.e., next hops) connected to each leaf switch (e.g., R1 130). It is not necessary for EP-A 110 and EP-B 120 to learn the specific paths (e.g., specific links forming each path) available and cognizance of their existence is sufficient.

Any suitable approach may be used to configure the network-cognizant mode and/or MAX_SF. For example, the configuration may be performed by a user (e.g., network administrator) who has knowledge of the leaf-spine topology and the number of leaf and spine switches in data center environment 300. It is also possible to initiate the configuration programmatically (e.g., using a script), such as based on relevant information (e.g., message, trigger, etc.) from a leaf switch, spine switch, endpoint, management device (not shown for simplicity), etc.

Figure 7:
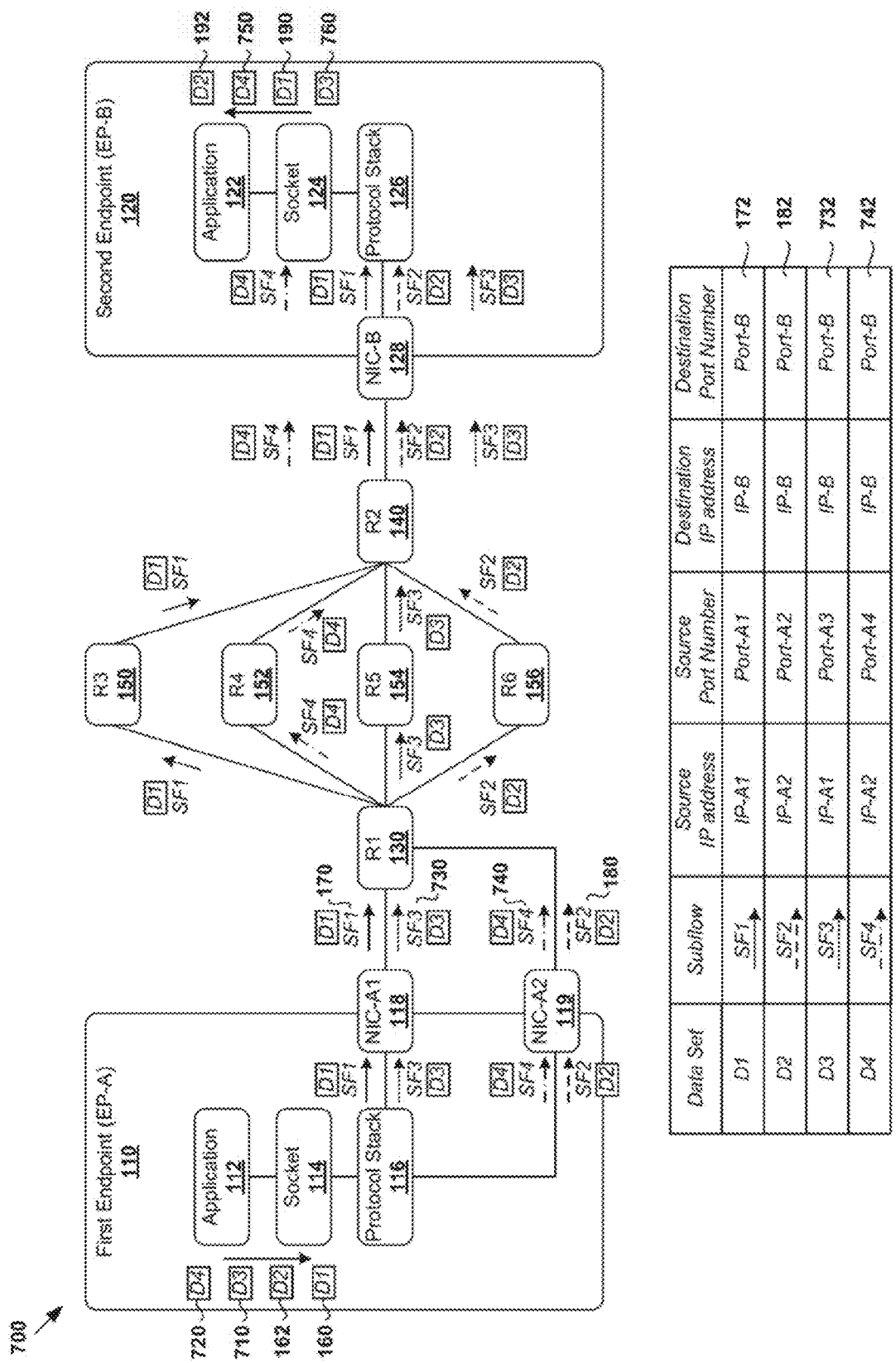
FIG. 7 is a schematic diagram illustrating an example network environment with an example multi-homed endpoint operating in a network-cognizant mode.

When operating in the network-cognizant mode, application throughput may be further improved the example in FIG. 1 by establishing multiple subflows over NIC-A1 118 and NIC-A2 119. For example, FIG. 7 is a schematic diagram illustrating example network environment 700 with example multi-homed endpoint 110 operating in a network-cognizant mode. It should be understood that network environment 700 may include additional and/or alternative components than that shown, depending on the desired implementation.

In the example in FIG. 7, application 112 sends third data set D3 (see 710) and fourth data set D4 (see 720) by invoking socket system calls. According to the example in FIGS. 5A and 5B, tag information such as "Tag-D3" for D3 710 and "Tag-D4" for D4 720 may be included in the (a) socket system calls or (b) associated data buffers. In particular, "send(s, buffer-D3, len, flags, Tag-D3)" may be used for D3 and "send(s, buffer-D4, len, flags, Tag-D4)" for D4. Alternatively, "send(s, buffer-D3, len, flags)" may be used for D3 and "send(s, buffer-D4, len, flags)" for D4. In this case, buffer-D3 includes Tag-D3 and buffer-D4 includes Tag-D4 to indicate their independence from each other, and from D1 160 and D2 162.

At protocol stack 116, based on the cognizance of multiple paths (e.g., MAX_SF=4) between EP-A 110 and EP-B 120 as well as the independence of the different data sets, multiple subflows may be established to send D1 160, D2 162, D3 710 and D4 720 in parallel. In addition to SF1 170 and SF2 180 explained above, subflow SF3 730 is established to send D3 710 over NIC-A1 118. To distinguish SF3 730 from other subflows, third set of tuples 732=(IP-A1, Port-A3, IP-B, Port-B) is configured for SF3 730. Further, SF4 740 is established to send D4 720 over NIC-A2 119 and identified by fourth set of tuples 742=(IP-A2, Port-A4, IP-B, Port-B).

At R1 130, path selection may be performed to select a first path via R3 150 for D1 160 based on tuples 172 and a second path via R6 156 for D2 162 based on tuples 182. Additionally, a third path via R5 154 is selected for D3 710 based on tuples 732 and a fourth path via R4 152 for D4 720 based on tuples 742. Again, at destination EP-B 120, the order of arrival is not important. For example, D2 (see 192) may be first delivered to application 122, followed by D4 (see 750), then D1 (see 190) and finally D3 (see 760). As such, head-of-blocking may be reduced because it is not necessary for data sets on different subflows to wait for each other.

Similar to the example in FIG. 1 and FIG. 6, protocol stack 126 of EP-B 120 may distinguish D1 (see 190), D2 (see 192), D3 (see 750) and D4 (see 760) from each other based on corresponding set of tuples (see 172 for SF1, 182 for SF2, 732 for SF3 and 742 for SF4). As packets of different subflows are received independently, EP-B 120 may store the packets arriving on a particular subflow in a different buffer, memory location, etc. Once all packets on that particular subflow (e.g., SF2 180) are received, protocol stack 126 delivers the corresponding data (e.g., D2) to application 122 via socket 124 independently of other subflow(s).

Examples of the present disclosure suitable in networks such as data center environment 300 paths between EP-A 110 and EP-B 120 are under a single autonomous domain. In this case, the multiple paths between EP-A 110 and EP-B 120 are usually known, which may be exploited to establish a MPTCP connection to send data sets in parallel. Such custom network environments should be contrasted with public networks (e.g., the Internet) in which endpoints and intermediate devices are usually controlled by different autonomous systems or domains.

Although EP-A 110 is shown as the initiator of the MPTCP connection, it will be appreciated that the examples discussed using FIG. 1 to FIG. 7 may be implemented by EP-B 120. As shown in FIG. 1, FIG. 6 and FIG. 7, EP-B 120 is single-homed and receives packets of all subflows via one network interface "NIC-B" 128. In practice, however, EP-B 120 may also be multi-homed, with each network interface configured to receive one or more of subflows.

The above examples can be implemented by hardware (including hardware logic circuitry), software or firmware or a combination thereof. The above examples may be implemented by any suitable computing device, network device, computer system, etc., which may include processor and memory that may communicate with each other via a bus, etc. The network device may include a non-transitory computer-readable medium having stored thereon instructions that, when executed by the processor, cause the processor to perform processes described herein with reference to FIG. 1 to FIG. 7.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing devices), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a first endpoint to transfer a first data set and a second data set to a second endpoint using a multipath connection, the method comprising:
    detecting the first data set and the second data set from an application executing on the first endpoint for transfer to the second endpoint;
    in response to determination that in-order transfer is not required for the first data set and the second data set based on first tag information associated with the first data set and second tag information associated with the second data set, wherein the first tag information differs from the second tag information,
    establishing a first subflow of the multipath connection with the second endpoint to send the first data set, wherein the first subflow is identified by a first set of tuples;
    establishing a second subflow of the multipath connection to send the second data set, wherein the second subflow is identified by a second set of tuples; and
    sending the first data set on the first subflow and the second data set on the second subflow to the second endpoint, wherein the first data set travels on a first path based on the first set of tuples, and the second data set travels on a second path based on the second set of tuples.

2. The method of claim 1, wherein the determination that in-order transfer is not required comprises:
    identifying the first tag information based on a first socket system call invoked by the application to send the first data set;
    identifying the second tag information based on a second socket system call invoked by the application to send the second data set; and
    comparing the first tag information with the second tag information to determine that the first data set is independent of the second data set.

3. The method of claim 2, wherein the identifying the first tag information and the second tag information comprises:
    identifying the first tag information from a first parameter of the first socket system call; and
    identifying the second tag information from a second parameter of the second socket system call.

4. The method of claim 2, wherein the identifying the first tag information and the second tag information comprises:
    identifying the first tag information from the first data set sent by the application via the first socket system call; and
    identifying the second tag information from the second data set sent by the application via the second socket system call.

5. The method of claim 1, wherein the sending the first data set and the second data set comprises:
    sending the first data set and the second data set to a leaf switch that connects the first endpoint to a first spine switch on the first path and a second spine switch on the second path in a data center environment, the leaf switch performing Equal Cost Multipath (ECMP) routing to select the first spine switch for the first data set based on the first set of tuples and the second spine switch for the second data set based on the second set of tuples.

6. A non-transitory computer-readable storage medium that includes a set of instructions which, in response to execution by a processor of a computing device, cause the processor to:
    detect a first data set and a second data set from an application executing on a first endpoint supported by the computing device for transfer to a second endpoint using a multipath connection;
    in response to determination that in-order transfer is not required for the first data set and the second data set based on first tag information associated with the first data set and second tag information associated with the second data set, wherein the first tag information differs from the second tag information,
    establish a first subflow of the multipath connection with the second endpoint to send the first data set, wherein the first subflow is identified by a first set of tuples;
    establish a second subflow of the multipath connection to send the second data set, wherein the second subflow is identified by a second set of tuples; and
    send the first data set on the first subflow and the second data set on the second subflow to the second endpoint, wherein the first data set travels on a first path based on the first set of tuples, and the second data set travels on a second path based on the second set of tuples.

7. The non-transitory computer-readable storage medium of claim 6, wherein the instructions for determining that in-order transfer is not required cause the processor to:
    identify the first tag information based on a first socket system call invoked by the application to send the first data set;
    identify the second tag information based on a second socket system call invoked by the application to send the second data set; and
    compare the first tag information with the second tag information to determine that the first data set is independent of the second data set.

8. The non-transitory computer-readable storage medium of claim 7, wherein the instructions for identifying the first tag information and the second tag information cause the processor to:
    identify the first tag information from a first parameter of the first socket system call; and
    identify the second tag information from a second parameter of the second socket system call.

9. The non-transitory computer-readable storage medium of claim 7, wherein the instructions for identifying the first tag information and the second tag information cause the processor to:
    identify the first tag information from the first data set sent by the application via the first socket system call; and
    identify the second tag information from the second data set sent by the application via the second socket system call.

10. The non-transitory computer-readable storage medium of claim 6, wherein the instructions for sending the first data set and the second data set cause the processor to:
    sending the first data set and the second data set to a leaf switch that connects the first endpoint to a first spine switch on the first path and a second spine switch on the second path in a data center environment, the leaf switch performing Equal Cost Multipath (ECMP) routing to select the first spine switch for the first data set based on the first set of tuples and the second spine switch for the second data set based on the second set of tuples.

11. A computing device configured to perform transfer a first data set and a second data set from a first endpoint supported by the computing device to a second endpoint using a multipath connection, comprising:
    a processor; and
    a non-transitory computer-readable medium having stored thereon instructions that, when executed by the processor, cause the processor to:
    detect the first data set and the second data set from an application executing on the first endpoint for transfer to the second endpoint;
    in response to determination that in-order transfer is not required for the first data set and the second data set based on first tag information associated with the first data set and second tag information associated with the second data set, wherein the first tag information differs from the second tag information, establish a first subflow of the multipath connection with the second endpoint to send the first data set, wherein the first subflow is identified by a first set of tuples;

establish a second subflow of the multipath connection to send the second data set, wherein the second subflow is identified by a second set of tuples; and send the first data set on the first subflow and the second data set on the second subflow to the second endpoint, wherein the first data set travels on a first path based on the first set of tuples, and the second data set travels on a second path based on the second set of tuples.

12. The computing device of claim 11, wherein the instructions for determining that in-order transfer is not required cause the processor to:

identify the first tag information based on a first socket system call invoked by the application to send the first data set;

identify the second tag information based on a second socket system call invoked by the application to send the second data set; and compare the first tag information with the second tag information to determine that the first data set is independent of the second data set.

13. The computing device of claim 12, wherein the instructions for identifying the first tag information and the second tag information cause the processor to:

identify the first tag information from a first parameter of the first socket system call; and identify the second tag information from a second parameter of the second socket system call.

14. The computing device of claim 12, wherein the instructions for identifying the first tag information and the second tag information cause the processor to:

identify the first tag information from the first data set sent by the application via the first socket system call; and identify the second tag information from the second data set sent by the application via the second socket system call.

15. The computing device of claim 11, wherein the instructions for sending the first data set and second data set cause the processor to:

send the first data set and second data set to a leaf switch that connects the first endpoint to a first spine switch and a second spine switch in a data center environment, the leaf switch performing Equal Cost Multipath (ECMP) routing to select the first spine switch for the first data set based on the first set of tuples and the second spine switch for the second data set based on the second set of tuples.

16. The computing device of claim 11, wherein the instructions for sending the first data set and second data set cause the processor to:

maintain in-order transfer in the first subflow or in the second subflow.

* * * * *